United States Patent
Kim et al.

(10) Patent No.: US 8,479,493 B2
(45) Date of Patent: Jul. 9, 2013

(54) OXIDATION CATALYSTS FOR ENGINES PRODUCING LOW TEMPERATURE EXHAUST STREAMS

(75) Inventors: Chang H Kim, Rochester, MI (US); Iljeong Heo, Seogwipo-Si (KR); Se H. Oh, Troy, MI (US); Wei Li, Troy, MI (US); Michelle H Schmid, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 263 days.

(21) Appl. No.: 13/111,143

(22) Filed: May 19, 2011

(65) Prior Publication Data

US 2012/0291420 A1    Nov. 22, 2012

(51) Int. Cl.
    *F01N 3/00*    (2006.01)
(52) U.S. Cl.
    USPC ............ 60/274; 60/285; 60/299; 60/301; 422/168; 422/171; 422/177; 422/180
(58) Field of Classification Search
    USPC ............ 60/274, 285, 299, 300, 301; 422/168, 422/170, 171, 177, 180
    See application file for complete search history.

(56) References Cited

U.S. PATENT DOCUMENTS

| | | | | |
|---|---|---|---|---|
| 6,725,647 | B2* | 4/2004 | Pfeifer et al. | 60/274 |
| 7,501,098 | B2* | 3/2009 | Chen et al. | 422/177 |
| 7,506,504 | B2* | 3/2009 | Kumar | 60/299 |
| 7,762,059 | B2* | 7/2010 | Zones et al. | 60/284 |
| 7,875,250 | B2* | 1/2011 | Nunan | 422/177 |
| 2009/0257935 | A1 | 10/2009 | Southward et al. | |

OTHER PUBLICATIONS

Jian-Liang Cao; Preparation, characterization and catalytic behavior of nanostructured mesoporous CuO/Ce0.8Zr0.2O2 catalysts for low-temperature CO oxidation; Elsevier; ScienceDirect; Applied Catalysis B: Environmental 78 (2008) 120-128; doi: 10.1016/j.apcatb.2007.09.007.

* cited by examiner

*Primary Examiner* — Binh Q Tran
(74) *Attorney, Agent, or Firm* — Reising Ethington P.C.

(57) ABSTRACT

The oxidation of carbon monoxide (CO) and hydrocarbons (HC) in an oxygen-containing gas stream, such as the exhaust stream from a diesel engine, or other lean-burn engine, may be catalyzed using a combination of mixed oxide particles of cerium, zirconium and copper, and discrete particles of an alumina-supported platinum group metal catalyst. The catalyzed oxidation of CO and HC by this combination of oxidation catalyst particles is effective at temperatures below 300° C.

12 Claims, 5 Drawing Sheets

OXIDATION CATALYSTS FOR ENGINES PRODUCING LOW TEMPERATURE EXHAUST STREAMS

TECHNICAL FIELD

This disclosure pertains to the catalyzed oxidation of carbon monoxide and incompletely burned hydrocarbons in an exhaust gas stream from a diesel or other lean-burn engine having a relatively low operating temperature and producing a low temperature exhaust gas. More specifically, this invention pertains to the use of particles of mixed oxides of cerium, zirconium and copper in combination with particles of at least one platinum group metal (PGM) supported on aluminum oxide particles for catalysis of such oxidation reactions at temperatures below 300° C.

BACKGROUND OF THE INVENTION

Engines for automotive vehicles may be configured and controlled to operate at varying proportions of air and fuel in their combustion mixtures. When combustion engines operate at a higher than stoichiometric air-to-fuel mass ratio, this mode of operation is referred to as "fuel-lean," and typically results in increased fuel combustion efficiency and, thus, improved fuel economy. Compression ignition engines, such as diesel engines, traditionally and primarily operate in a fuel-lean mode. Spark ignition engines, such as gasoline engines, may also be controlled to operate in a fuel-lean mode to take advantage of the associated improved fuel economy.

Today, advanced internal combustion engines may be controlled, such as by a computer module, to operate in a plurality of modes. For example, some advanced combustion engines may selectively operate in fuel-lean and fuel-rich modes to realize better combustion stability and fuel economy, while decreasing the amount of certain combustion emissions in the exhaust gas.

The exhaust gas from an engine operating in a fuel-lean mode has a relatively low temperature and contains undesirable gaseous emissions, such as carbon monoxide (CO), unburned hydrocarbons (HC) and nitrogen oxides ($NO_x$). Specifically, the exhaust gas temperature from an engine operating in a fuel-lean mode may be 150 degrees Celsius, or below. Periods of even lower operating temperatures may occur, such as during the initial cold-start period of engine operation, and when the engine is running at low speeds or at idle. It is desired to treat such exhaust gas compositions to minimize the discharge of any substance to the atmosphere other than nitrogen ($N_2$), carbon dioxide ($CO_2$), and water. In order to convert the gaseous emissions of CO, HC, and $NO_x$ into these more innocuous gases, the exhaust gas may be passed through a treatment system where it can contact at least one catalyst to help (1) oxidize the CO to $CO_2$, (2) oxidize the HC to $CO_2$ and water, and (3) reduce the $NO_x$ to $N_2$.

An exhaust gas treatment system for a combustion engine may include an oxidation catalyst for the oxidation of CO to $CO_2$ and HC to $CO_2$ and water. A traditional oxidation catalyst includes one or more platinum group metals (PGMs) supported as catalysts. PGM refers, collectively, to six metallic elements on the periodic table and includes ruthenium, platinum, palladium, rhodium, osmium, and iridium. However, the activation temperature of commercially-available PGM-based oxidation catalysts is typically greater than 175° C., but, as discussed above, the exhaust gas temperature from a lean-burn engine can be about 150° C., or lower.

In order to increase the oxidation performance of a traditional PGM-based oxidation catalyst at relatively low temperatures, the amount of PGM in the catalyst can be increased. However, increasing the PGM loading of the oxidation catalyst can only lower the activation temperature of the catalyst to a limited degree. And, since PGMs are relatively expensive, increasing the PGM loading can significantly increase the cost of the catalyst. There is a need for a less-expensive oxidation catalyst with equal, or preferably better, CO and HC oxidation activity at low temperatures in order to treat the exhaust gas from modern lean-burn and advanced combustion engines that have relatively low operating temperatures.

SUMMARY OF THE INVENTION

It is found that particles of mixed oxides of Ce, Zr, and Cu can be combined with discrete particles of at least one platinum group metal (PGM) catalyst dispersed on particles of aluminum oxide ($Al_2O_3$), and, when suitably combined, these oxidation catalysts can effectively oxidize CO and HC in an exhaust gas stream comprising CO and HC and having a relatively low temperature that is often below 300° C.

The composition of the mixed oxides has a metal component that consists essentially of the elements of cerium (Ce), zirconium (Zr), and copper (Cu). In suitable embodiments, the metal component may comprise, by mole, about 30 to 70% Ce, about 30 to 70% Zr, and the balance being Cu. In preferred embodiments of this invention, the metal component comprises, by mole, about 60% Ce, about 15% Zr, and about 25% Cu.

The CeZrCu mixed oxides are preferably prepared for use as powder catalysts by co-precipitating the three metals from an aqueous solution. The precipitate is dried, ball-milled and calcined to form particles of a solid solution of $CeZrCuO_2$. A solid solution of the mixed oxides of Ce, Zr, and Cu occurs when the oxide molecules share a single crystal lattice.

The particles of at least one PGM preferably consist of a combination of platinum (Pt) and palladium (Pd), and the mass ratio of Pt to Pd in the Pt—Pd/$Al_2O_3$ particles is preferably 7:1. Particles of Pt and Pd preferably comprise between 0.75 to 1.5 weigh percent of the $CeZrCuO_2$ and Pt—Pd/$Al_2O_3$-containing particulate catalyst.

In a suitable embodiment, the prepared catalyst particles may be used in the form of a washcoat layer or layers, which are coated onto the walls of the channels of a honeycomb-shaped, monolithic support body comprising a plurality of fine parallel flow-through channels extending longitudinally from an inlet face to an outlet face of the support body. Fine particles of $CeZrCuO_2$ and Pt—Pd/$Al_2O_3$ are dispersed in aqueous solutions, which are applied to and baked onto the walls of the channels of the support body to form the washcoat layers.

The catalyst-coated support body is suitably placed in a container located in the path of an exhaust gas stream so that the exhaust gas flows through the channels and contacts the catalyst particles dispersed on the channel walls. The support body is sized to provide a suitable number of channels (preferably, at least 400 per square inch) to collectively accommodate a desired flow rate of the exhaust gas stream, and, thus, a desired residence time of the exhaust gas within the support body. A suitable space velocity (i.e., relationship between a volume of exhaust gas flow and an available flow volume within the channels of the support body) is 30,000 $hr^{-1}$.

In preferred embodiments of this invention, these oxidation catalysts are combined by coating discrete washcoat layers onto the walls of the support body, with each discrete layer comprising particles of CeZrCuO$_2$ or particles of Pt—Pd/Al$_2$O$_3$. In a suitable "dual-layer" arrangement, a first washcoat layer, comprising particles of Pt—Pd/Al$_2$O$_3$, is coated onto the channel walls from the inlet face to the outlet face of the support body, and a second layer, comprising particles of CeZrCuO$_2$, is coated onto the channel walls so that it overlies the first washcoat layer. In a suitable "zone-coat" arrangement, the first washcoat layer is coated onto a portion, or zone, of the channel walls near the inlet face, and the second washcoat layer is coated onto a discrete portion, or zone, of the channel walls near the outlet face of the support body.

Other objects and advantages of this invention will be apparent from a further description of preferred (but not-limiting) embodiments of the invention.

DESCRIPTION OF PREFERRED EMBODIMENTS

It is found that particles of CeZrCu mixed oxides can be combined with discrete particles of at least one PGM catalyst supported on particles of aluminum oxide (Al$_2$O$_3$), and, when suitably combined, these oxidation catalysts can effectively oxidize CO and HC at relatively low temperatures (about 125 to about 300° C.).

In preferred embodiments of this invention, these oxidation catalysts are combined by coating discrete washcoat layers onto the walls of an extruded ceramic, honeycomb-shaped, flow-through support body that is housed within a container located in the path of an exhaust gas stream from a lean-burn engine.

Figure 1:
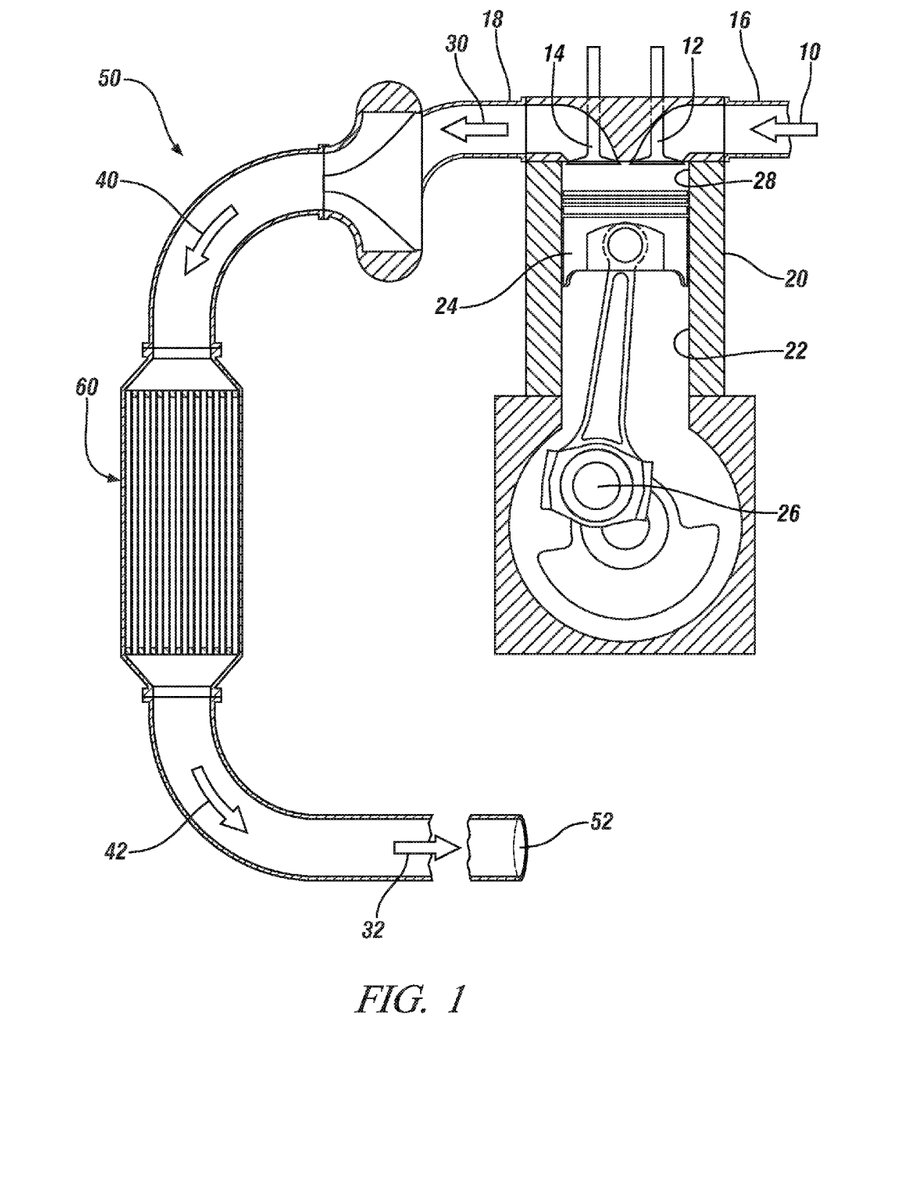
FIG. 1 is a schematic illustration of the path of a gas stream containing a mixture of air and fuel that is delivered to the cylinders of an internal combustion engine, exits the engine from the exhaust manifold as an exhaust gas stream into an exhaust gas treatment system, and is expelled through a tailpipe opening to the ambient atmosphere as a treated exhaust gas stream.

A suitable catalyzed oxidation reactor 60 is illustrated in FIG. 1. Referring to FIG. 1, a mixture of air and fuel 10 enters an internal combustion engine 20 and exits as an exhaust gas 30, the exhaust gas stream 40 then passes through an exhaust gas treatment system 50 including an oxidation catalyst or catalysts 60 for the effective oxidation of CO and HC in the exhaust gas 30.

The multi-cylinder, reciprocating piston, internal combustion engine 20 may be a charge compression engine (i.e., diesel engine), a spark ignition direct injection engine (i.e., gasoline engine, which may or may not contain an in-cylinder fuel injector), or a homogeneous charge compression ignition engine. Each of these types of engines includes cylinders 22 (usually four to eight cylinders) that accommodate reciprocating piston heads 24 connected to a crankshaft 26. Located above each piston head 24 is a combustion chamber 28 that receives a mixture of air and fuel 10 through an intake valve 12 at specifically timed intervals. The spark or compression assisted ignition of the air and fuel mixture 10 in the combustion chambers 28 invokes rapid downward linear movement of their respective piston heads 24 to drive rotation of the crankshaft 26. The reactive upward movement of each piston head 24, a short time later, expels the combustion products from each combustion chamber 28 through an exhaust valve 14.

The engine 20 is supplied with a continuous air flow at a variable mass flow rate responsive to engine performance demands (i.e, pressing and depressing a foot pedal located in the driver-side compartment to affect vehicle speed and acceleration). A calculated quantity of pressurized fuel is rapidly and intermittently injected into an incoming air flow just upstream from the engine 20, as dictated, for example, by an engine control strategy, to produce a mixture of air and fuel that exhibits the instantly desired air to fuel mass ratio (not shown). The quantity of fuel injected into the incoming air flow is controlled to maintain a lean air to fuel mass ratio or a rich air to fuel mass ratio, or to switch between the two states.

The mixture of air and fuel 10 enters an intake manifold 16 of the internal combustion engine 20 and exits as an exhaust gas 30 through the exhaust manifold 18. The intake manifold 16 delivers the air and fuel mixture 10 into the combustion chambers 28 through the intake valve 12 and then to the cylinders 22 of the engine 20. The air and fuel mixture 10 is compressed, heated, and thereby ignited to power the reciprocating piston heads 24 in the cylinders 22 of the engine 20. The spent combustion products (including CO, HC, and $NO_R$) are expelled from the cylinders 22 of the engine 20 by the exhaust strokes of the pistons 24 and into the exhaust manifold 18 through the exhaust valve 14. The exhaust manifold 18 delivers the combustion products to the exhaust gas treatment system 50 as the exhaust gas 30. The treatment system 50 communicates the exhaust gas 30 to the catalyzed oxidation reactor 60 for the effective oxidation of CO and HC.

Figure 2:
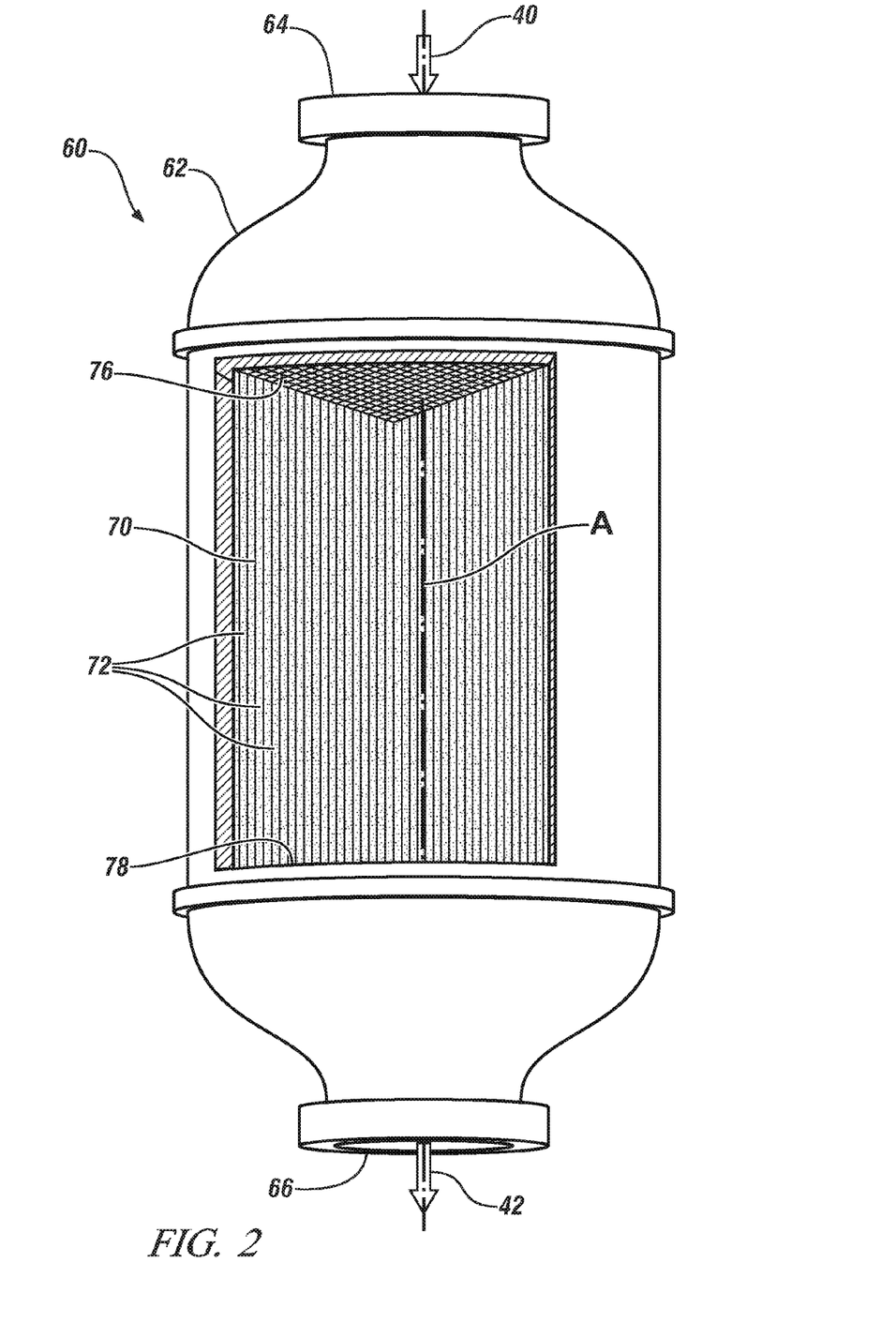
FIG. 2 is a schematic illustration of a reactor located in the exhaust gas treatment system shown in FIG. 1 and depicts a container housing a catalyst-coated support body with a wedge cut away from a portion of the container and the support body to better reveal the parallel flow-through channels extending therethrough.
Figure 3:
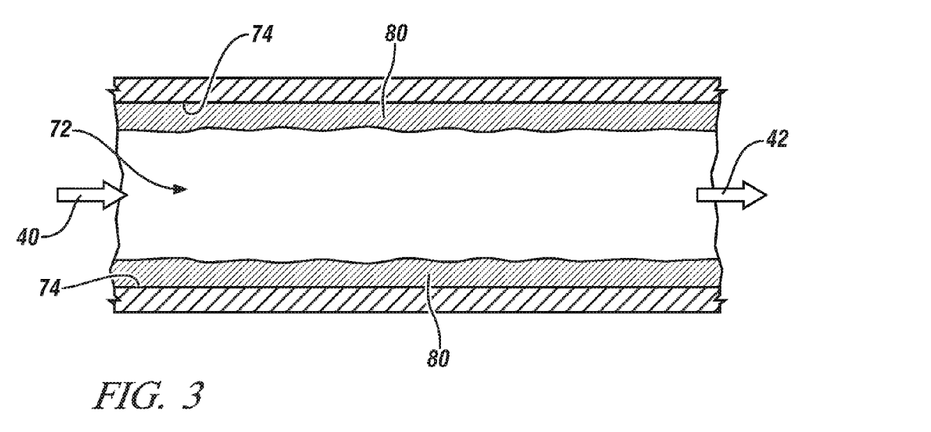
FIG. 3 is a schematic illustration of a fragment of a flow-through channel of the support body shown in FIG. 2 and depicts a washcoat layer on the walls of a portion of a channel, the washcoat layer consisting essentially of particles of CeZrCuO$_2$ physically mixed with discrete particles of Pt—Pd/Al$_2$O$_3$.

As shown in FIGS. 1-3, the exhaust gas stream 40 enters the catalyzed oxidation reactor 60 and passes through the flow-through channels 72 of the support body 70 where it contacts the oxidation catalysts which is dispersed on the walls 74 of the channels 72 as at least one washcoat layer 80 containing fine particles of the catalysts. The high-surface area of the channel walls 74 creates sufficient contact between the exhaust gas 30 and the catalyst particles for the desired oxidation reactions to occur. The exhaust gas treatment system 50 then communicates the exhaust gas stream 40 from the catalyzed oxidation reactor 60 as a treated exhaust gas stream 42. The treated exhaust gas 32 is expelled from the treatment system 50 through a vent 52 to the ambient atmosphere.

A suitable oxidation reactor 60 for the catalyzed oxidation reactions disclosed herein is shown in FIG. 2, and is piped within the exhaust gas treatment system 50 to facilitate continuous passage of the exhaust gas stream 40 therethrough. The oxidation reactor 60 comprises an alloy steel container 62 shaped with an upstream opening 64 for exhaust gas entry, and a downstream opening 66 for exhaust gas through-flow. The body of the container 62 is often round or elliptical in cross-section and sized to hold a support body 70 which is coated with a washcoat layer or layers containing the catalyst particles. In FIG. 2, a wedge portion of the container 62 and the catalyst-coated support body 70 have been cut-away to better reveal the internal channels 72 extending therethrough The support body 70, as shown in FIG. 2, is a honeycomb-shaped monolith with an inlet face 76 and an outlet face 78 transverse to the exhaust gas stream 40 (that is, along the flow axis A), and includes several small, square, parallel flow-through channels 72 defined by walls 74, and extending longitudinally from the inlet face 76 to the outlet face 78 of the support body. Since each channel 72 is small in cross-section for admitting the exhaust gas stream 40, the inlet face 76 of the support body is sized to provide a suitable number of channels 72 to collectively accommodate a desired flow rate for the exhaust gas stream 40. For example, the support body 70 may contain about four-hundred channels 72 per square inch of inlet face 76 cross-sectional area. The preferred thickness of the channel walls 74 is between 0.002 and 0.015 inches. While extruded ceramic, honeycomb-shaped monoliths have proven effective and durable for oxidation catalysts, other catalyst support bodies of different materials may be used.

Figure 4:
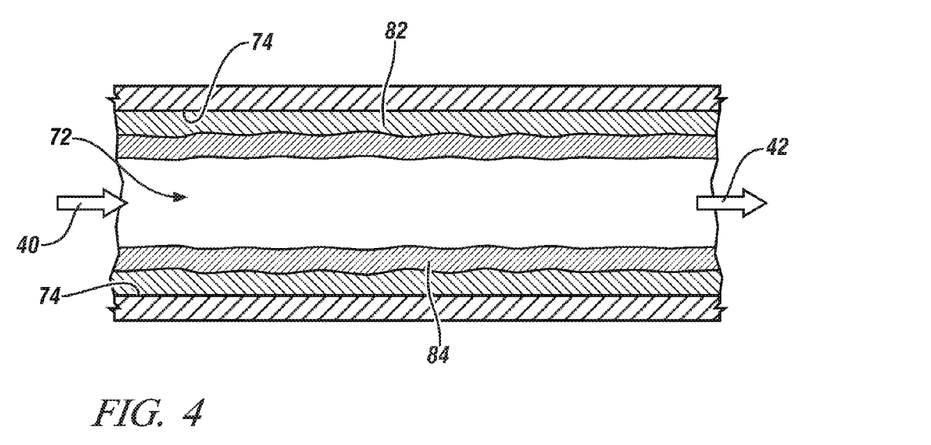
FIG. 4 is a schematic illustration of a fragment of a flow-through channel of the support body shown in FIG. 2 and depicts a "dual-layer" arrangement with a first washcoat layer, consisting essentially of particles of PGM/Al$_2$O$_3$, and a second washcoat layer consisting essentially of CeZrCuO$_2$, wherein the second layer is overlying the first layer on the channel walls.
Figure 5:
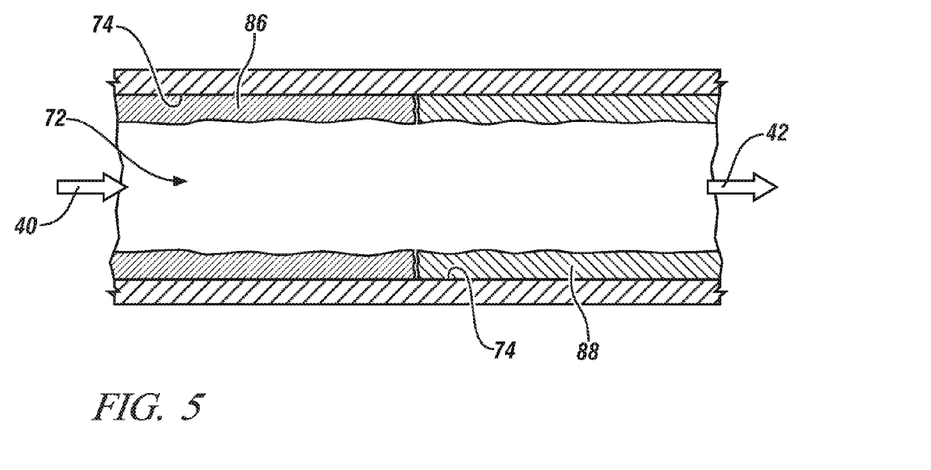
FIG. 5 is a schematic illustration of a fragment of a flow-through channel of the support body shown in FIG. 2 and depicts a "zone-coat" arrangement with a first washcoat layer, consisting essentially of particles of CeZrCuO$_2$, and a second washcoat layer consisting essentially of particles of PGM/Al$_2$O$_3$, wherein the first layer is coated on a portion of the channel near the inlet face of the support body and the second layer is coated on a discrete portion of the channel near the outlet face of the support body.

As shown in FIGS. 3, 4 and 5, small particles of the oxidation catalysts are deposited on the walls 74 of the flow-through channels 72 in the form of a washcoat layer 80 or layers 82, 84, 86, 88, and several deposition arrangements are possible.

In a suitable embodiment, shown in FIG. 3, the support body 70 may be dipped in an aqueous solution containing particles of $CeZrCuO_2$ and discrete particles of Pt—Pd/$Al_2O_3$, which is then baked to dry the catalyst particles to the walls 74 and form a washcoat layer 80 on the walls 74 of the flow-through channels 72. The washcoat layer 80 shown in FIG. 3 is merely an idealized depiction; it is not drawn to scale and is not meant to represent the actual deposition arrangement of the catalyst particles.

In another embodiment, shown in FIG. 4, the support body 70 may be coated with discrete washcoat layers 82, 84. The support body 70 may be dipped in an aqueous solution containing particles of Pt—Pd/$Al_2O_3$, which is then baked to dry the catalyst particles to the walls 74 and form a first washcoat layer 82 consisting essentially of particles of Pt—Pd/$Al_2O_3$. The support body 70 may then be dipped in an aqueous solution containing particles of $CeZrCuO_2$ and dried to form a second washcoat layer 84 overlying the first washcoat layer 82. This "dual-layer" arrangement provides two discrete layers 82, 84 that form a continuous catalyst coating along the entire support body 70.

In yet another embodiment, shown in FIG. 5, a first washcoat layer 86 containing particles of $CeZrCuO_2$ may be formed on one-half of the support body 70 near the inlet face 76, and a second washcoat layer 88 containing particles of Pt—Pd/$Al_2O_3$ may be formed on the remaining half of the support body 70 near the outlet face 78. This "zone-coating" arrangement provides two equally-sized, discrete layers 86, 88 that, together, form a continuous catalyst coating along the entire support body 70.

Figure 6:
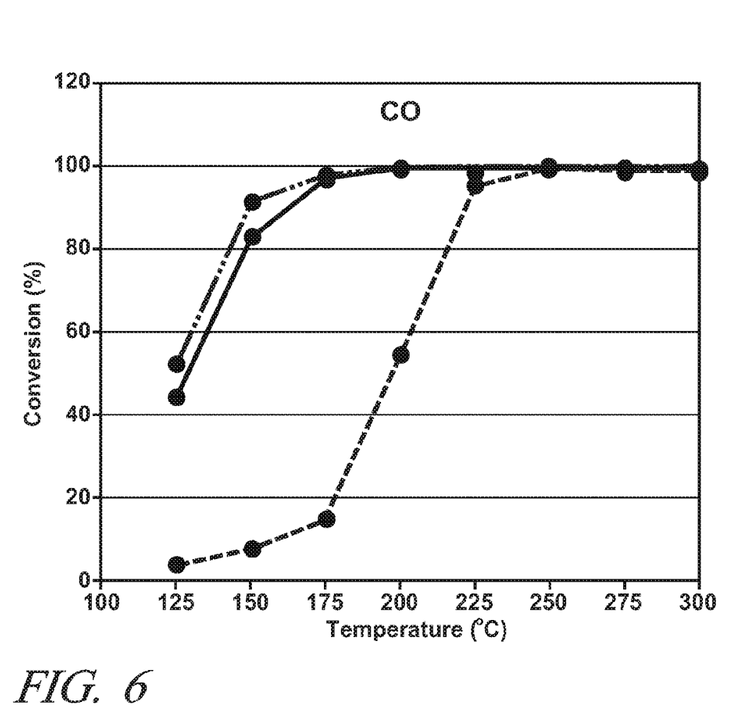
FIG. 6 is a graph of percent conversion of CO by oxidation versus temperature (° C.) over: a CeZrCuO$_2$ catalyst (dash dot line), a Pt—Pd/Al$_2$O$_3$ catalyst (dash line), and a Pt—Pd/Al$_2$O$_3$ and CeZrCuO$_2$-containing catalyst (solid line) in a synthetic exhaust gas stream containing 500 ppm CO, 200 ppm NO, 260 ppm C$_3$H$_6$, 90 ppm C$_3$H$_8$, 112 ppm C$_{12}$H$_{26}$, 83 ppm C$_8$H$_{10}$, 8% O$_2$, 8% H$_2$O, and the balance N$_2$ as balance, with a temperature range between 125 to 300° C.
Figure 7:
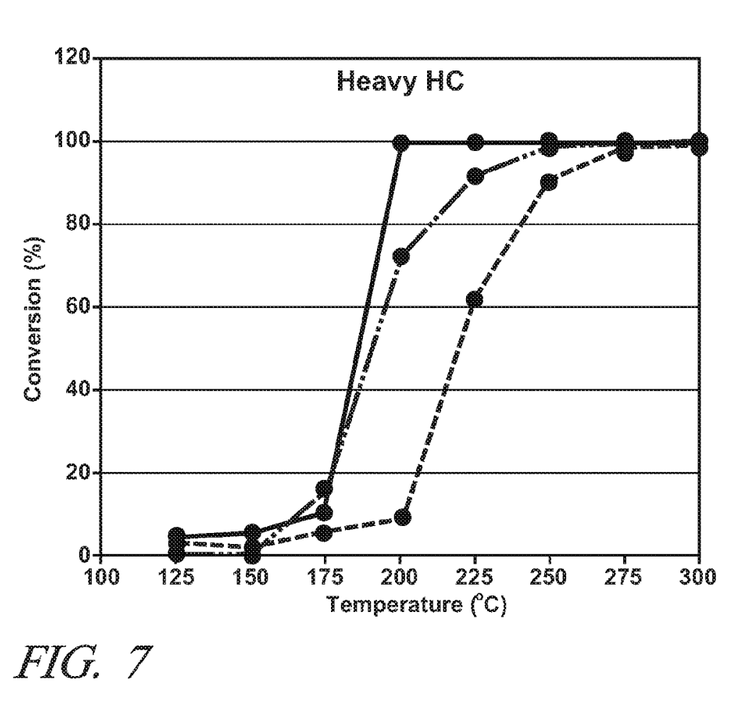
FIG. 7 is a graph of percent conversion of heavy HC by oxidation versus temperature (° C.) over: a CeZrCuO$_2$ catalyst (dash dot line), a Pt—Pd/Al$_2$O$_3$ catalyst (dash line), and a Pt—Pd/Al$_2$O$_3$ and CeZrCuO$_2$-containing catalyst (solid line) in a synthetic exhaust gas stream containing 500 ppm CO, 200 ppm NO, 260 ppm C$_3$H$_6$, 90 ppm C$_3$H$_8$, 112 ppm C$_{19}$H$_{26}$, 83 ppm C$_8$H$_{10}$, 8% O$_2$, 8% H$_2$O, and the balance N$_2$ as balance, with a temperature range between 125 to 300° C.
Figure 8:
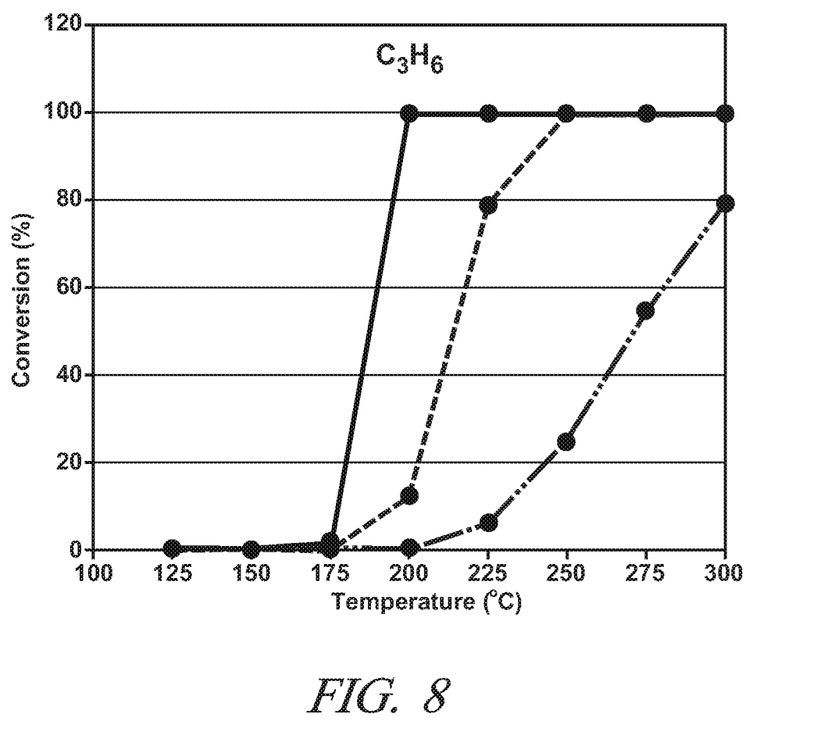
FIG. 8 is a graph of percent conversion of C$_3$H$_6$ by oxidation versus temperature (° C.) over: a CeZrCuO$_2$ catalyst (dash dot line), a Pt—Pd/Al$_2$O$_3$ catalyst (dash line), and a Pt—Pd/Al$_2$O$_3$ and CeZrCuO$_2$-containing catalyst (solid line) in a synthetic exhaust gas stream containing 500 ppm CO, 200 ppm NO, 260 ppm C$_3$H$_6$, 90 ppm C$_3$H$_8$, 112 ppm C$_{12}$H$_{26}$, 83 ppm C$_8$H$_{10}$, 8% O$_2$, 8% H$_2$O, and the balance N$_2$ as balance, with a temperature range between 125 to 300° C.

The inventors herein have observed that CO present in an exhaust gas stream may inhibit the oxidation of HC over a traditional PGM-based oxidation catalyst, and vice versa, especially at temperatures below 200° C. But, as shown in FIGS. 6, 7, and 8, an suitably combining particles of the $CeZrCuO_2$ catalyst with discrete particles of the Pt—Pd/$Al_2O_3$ catalyst can efficiently oxidize CO and HC in a synthetic exhaust gas stream containing significant amounts of both CO and HC at very low temperatures (between 125 to 300° C.). It is thought that arranging the catalysts in discrete layers allows for cooperation between the catalysts, which promotes the efficient oxidation of both CO and HC. In the arrangements discussed above, the $CeZrCuO_2$ catalyst particles can efficiently remove CO from an exhaust gas stream at very low temperatures, and the Pt—Pd/$Al_2O_3$ catalyst particles can more effectively oxidize HC at low temperatures after an amount of CO has been removed from the exhaust gas.

The oxidation catalysts of the present invention have utility for applications other than the treatment of diesel or gasoline engine exhaust, and may be useful for oxidation of gas-borne oxidizable components generally, such as the exhaust of compressed natural gas engines, ethanol-fueled engines, compressors, gas turbines, etc.

The exhaust gas may be exposed to other devices or mechanical equipment, not expressly shown in FIG. 1, that may or may not help produce the treated exhaust gas stream 42. These devices include, for example, another oxidation catalyst, a three-way catalyst, a particulate filter, a selective catalytic reduction (SCR) catalyst device, an exhaust gas recirculation line, a turbocharger turbine, a muffler, and/or a resonator. Skilled artisans will undoubtedly know of and understand, these and the many other devices that the exhaust gas could be exposed to.

EXAMPLES

A suitable CeZrCu mixed oxide catalyst material is prepared by dissolving predetermined proportions of cerium, zirconium and copper nitrates in an aqueous solution at room temperature with stirring for about 0.5 hours. A 1M sodium hydroxide solution is added to the aqueous solution with vigorous stirring until the pH value of the solution reaches 10 and a suspended co-precipitate of the metals forms. The suspended solution is then left at room temperature for 18 hours with mild stirring, then heated to 80° C. for 2 hours, washed with hot water, dried overnight at 110° C., and then calcined at 400° C. for 4 hours. X-ray diffraction patterns of the prepared $CeZrCuO_2$ catalyst material can confirm that this method of preparation results in a one-phase crystalline structure, or solid solution of the three metals. The composition of the resulting powder catalyst by this example is 60 mol % cerium, 15 mol % zirconium, and 25 mol % copper based upon 100 mol % of the metal component in the material. The density of the prepared $CeZrCuO_2$ solid powder catalyst material is about 2.01 g/cc, with a pore volume of 0.386 cc/g. The BET surface area of the prepared $CeZrCuO_2$ catalyst material is about 31 $m^2/g$.

The benchmarking catalyst used for comparison contains 1.5 wt. % platinum and palladium supported on an aluminum oxide ($Al_2O_3$) carrier material. The molar ratio of platinum to palladium in this catalyst is 7:1. The density of this Pt—Pd/$Al_2O_3$ catalyst material is 0.68 g/cc, with a pore volume of 0.71 cc/g.

Example 1

The oxidation activity of these powder catalysts can be measured by placing 0.1056 cc of catalyst powder in a packed bed quartz tube reactor having an outer diameter of ⅜ inch. A synthetic diesel exhaust gas containing 500 ppm CO, 260 ppm $C_3H_6$, 90 ppm $C_3H_8$, 112 ppm $C_{12}H_{26}$, 83 ppm $C_8H_{10}$, 200 ppm NO, 8% $O_2$, 8% $H_2O$, and the balance $N_2$ is regulated by mass flow controllers and fed to the reactor through heated stainless steel lines at a flow rate of 300 cc/min, corresponding to a space velocity of 170,000 $hr^{-1}$. The oxidation activity over the catalyst material is measured over a temperature range from 125° to 300° C., and the temperature is increased stepwise by 25° C. with a 5° C./min ramp rate.

The oxidation activity of the $CeZrCuO_2$ catalyst and the 1.5% Pt—Pd/$Al_2O_3$ catalyst are evaluated by measuring the % CO and HC conversion over each catalyst bed. The light-off temperature, or temperature at which a 50% conversion rate is achieved ($T_{50}$), is used for comparison purposes. The $T_{50}$ for CO conversion over the $CeZrCuO_2$ catalyst is 124° C., while the 1.5% Pt—Pd/$Al_2O_3$ catalyst achieves a $T_{50}$ of 196° C. The $T_{50}$ for heavy HC($C_{12}H_{26}$ and $C_8H_{10}$) conversion over the $CeZrCuO_2$ catalyst is 190° C., while the 1.5% Pt—Pd/$Al_2O_3$ catalyst achieves a $T_{50}$ of 219° C. Therefore, the $CeZrCuO_2$ catalyst can be used for low temperature CO and heavy HC oxidation in the exhaust gas of a lean-burn engine as it has better oxidation activity than the benchmarking catalyst. The $T_{50}$ for $C_3H_6$ conversion over the $CeZrCuO_2$ catalyst is 271° C., and the 1.5% Pt—Pd/$Al_2O_3$ catalyst achieves a $T_{50}$ of 214° C. That is, the $C_3H_6$ oxidation activity of the $CeZrCuO_2$ catalyst is not nearly as high at low temperatures as that of the standard 1.5% Pt—Pd/Al catalyst.

Example 2

In another example, particles of the $CeZrCuO_2$ catalyst are impregnated with a mixture of platinum and palladium by an incipient wetness impregnation method so that the catalyst contains the same amount of Pt and Pd as the benchmarking catalyst per specific volume of catalyst. Specifically, 29.75 grams of $CeZrCuO_2$ powder (corresponding to the equivalent volume of 10 grams of alumina powder) is mixed with an aqueous solution of Pt and Pd nitrates containing 0.0886 g Pt and 0.0127 g Pd as the metal weight, respectively. The mixed solution is dried overnight at 110° C., and calcined at 500° C. for 2 hours.

The measured $T_{50}$ for CO conversion over the 1.5% Pt—Pd/$CeZrCuO_2$ catalyst is 124° C., which is nearly identical to the % CO conversion achieved over the $CeZrCuO_2$ catalyst by itself. The $T_{50}$ for heavy HC($C_{12}H_{26}$ and $C_8H_{10}$) conversion over the 1.5% Pt—Pd/$CeZrCuO_2$ catalyst is 220° C. and is similar to the 1.5% Pt—Pd/Al catalyst ($T_{50}=219°$ C.). However, the oxidation activity of the 1.5% Pt—Pd/$CeZrCuO_2$ catalyst for heavy HC is lower than the activity for of the $CeZrCuO_2$ catalyst by itself, which indicates that direct contact of Pt—Pd with $CeZrCuO_2$ retards heavy HC oxidation.

The $T_{50}$ for $C_3H_6$ conversion over the 1.5% Pt—Pd/$CeZrCuO_2$ catalyst is 265° C., which is much higher than the benchmarking catalyst ($T_{50}=214°$ C.), but similar to the $CeZrCuO_2$ catalyst by itself ($T_{50}=271°$ C.). That is, the $C_3H_6$ oxidation activity of 1.5% Pt—Pd/$CeZrCuO_2$ catalyst and the $CeZrCuO_2$ catalyst is not nearly as high at low temperatures as that of the standard 1.5% Pt—Pd/Al catalyst. As such, the impregnation of Pt—Pd on $CeZrCuO_2$-based catalyst material is not beneficial for light HC oxidation.

Example 3

In order to incorporate the low temperature CO and heavy HC oxidation activity of the $CeZrCuO_2$ catalyst with the excellent $C_3H_6$ oxidation activity of the 1.5% Pt—Pd/$Al_2O_3$ catalyst, particles of $CeZrCuO_2$ are suitably combined with particles of 3 wt. % Pt—Pd/$Al_2O_3$. This combination of oxidation catalysts is created by taking half amounts of $CeZrCuO_2$ and 3 wt. % Pt—Pd/$Al_2O_3$ particles and simply shaking them together by hand A 3 wt. % Pt—Pd/$Al_2O_3$ powder is used, instead of 1.5 wt. %, to create an oxidation catalyst with an amount of Pt—Pd equal to the benchmarking catalyst. By this method, Pt—Pd is loaded only on alumina and direct contact of Pt—Pd with $CeZrCuO_2$ is prevented.

As shown in FIGS. 6, 7 and 8 dramatic decreases in the activation temperature for CO, heavy HC, and $C_3H_6$ oxidation result over the combination of oxidation catalysts. The light-off temperature for CO, heavy HC and $C_3H_6$ over this oxidation catalyst is 129, 186 and 187° C., respectively, which is 67, 33 and 34° C. lower than for the benchmarking catalyst. Indeed, $C_3H_6$ oxidation activity is extremely improved by combining particles of $CeZrCuO_2$ with particles of 3% Pt—Pd/$Al_2O_3$. Also, the heavy HC conversion of the 3% Pt—Pd/$Al_2O_3$+$CeZrCuO_2$ oxidation catalyst is slightly higher than that of the $CeZrCuO_2$ catalyst by itself. Since CO and HCs compete with each other to be oxidized over the Pt—Pd catalyst, the presence of CO normally retards the oxidation rate of HC over a Pt—Pd-based catalyst. However, in this arrangement, the $CeZrCuO_2$ catalyst enables the low temperature oxidation of CO, which lessens its inhibiting effect, and allows the Pt—Pd/$Al_2O_3$ catalyst to oxidize HC more readily at low temperatures.

For ease of comparison, the light-off temperatures ($T_{50}$ ° C.) for CO, heavy HC, and $C_3H_6$ over these catalysts are tabled below:

|  | CO | Heavy HC | $C_3H_6$ |
| --- | --- | --- | --- |
| 1.5% Pt—Pd/$Al_2O_3$ | 196 | 219 | 214 |
| $CeZrCuO_2$ only | 124 | 190 | 271 |
| 1.5% Pt—Pd/$CeZrCuO_2$ | 124 | 220 | 265 |

| | CO | Heavy HC | C₃H₆ |
|---|---|---|---|
| 3% Pt—Pd/Al₂O₃ + CeZrCuO₂ | 129 | 186 | 187 |

Example 4

In order to consider the real-life application of the prepared catalysts in the present study, all the catalysts are aged in an oven at 750° C. for 72 hours in flowing air with 10% H₂O. After hydrothermal aging, the oxidation catalyst activities are again examined with the same activity test protocol as in the case of the fresh catalysts.

In the case of the benchmarking catalyst, CO oxidation activity is somewhat increased by catalyst aging while hydrocarbon oxidation activity can still be observed, regardless of the catalyst aging. After hydrothermal aging, the combined of oxidation catalyst, 3% Pt—Pd/Al₂O₃+CeZrCuO₂, appears to lose its CO and HC oxidation activity as compared to the fresh catalysts. Specifically, the oxidation activity for CO and HC over the combined oxidation catalyst at temperatures less than 200° C. is slightly lower than that of the benchmarking catalyst. But, above 200° C., the oxidation activity for CO and HC over the combined oxidation catalyst is greater than that of the benchmarking catalyst. Therefore, this combined oxidation catalyst is still regarded as a promising candidate for CO and HC oxidation at low temperatures even after catalyst aging.

Example 5

In order to reduce the cost of the combined oxidation catalyst, a catalyst with a lower amount of Pt—Pd is prepared by combining CeZrCuO₂ with 1.5% Pt—Pd/Al₂O₃ (instead of 3% Pt—Pd/Al₂O₃ used previously). This combined oxidation catalyst contains half as much Pt—Pd as the benchmarking catalyst. For comparison with the 1.5% Pt—Pd/Al₂O₃+CeZrCuO₂ catalyst, equal amounts of 1.5% Pt—Pd/Al₂O₃ and γ-alumina (Al) are combined. The 1.5% Pt—Pd/Al₂O₃+Al catalyst contains half the amount of Pt—Pd compared to the benchmarking catalyst based upon the same volume and weight of the catalyst. Although the density of the combined oxidation catalyst is different than the benchmarking catalyst, the amount of Pt—Pd in the specific volume of the combined oxidation catalyst is equivalent to the 0.75 wt. % Pt—Pd/Al₂O₃.

As shown in FIGS. 6, 7 and 8, CO and heavy HC oxidation activity over the 1.5% Pt—Pd/Al₂O₃+CeZrCu catalyst is better than the benchmarking catalyst. And the conversion of C₃H₆ over the 1.5% Pt—Pd/Al₂O₃+CeZrCu catalyst is comparable to that of the benchmarking catalyst. Therefore, the 1.5% Pt—Pd/Al₂O₃+CeZrCu catalyst has potential as an alternative to the benchmarking catalyst.

Preferred embodiments and practices of this invention have been presented for illustrative purposes and are not to be construed as limiting the scope of the embodiments of the present disclosure.

The invention claimed is:

1. A method of oxidizing carbon monoxide (CO) and hydrocarbons (HC) in an exhaust gas stream of an internal combustion engine; the method comprising:
    operating an internal combustion engine to burn a mixture of air and fuel in which a fuel content in the mixture is lean with respect to the stoichiometric air-to-fuel mass ratio, the engine producing an exhaust gas stream having a temperature that is often below 300 degrees Celsius;
    passing the exhaust gas stream in contact with an oxidation catalyst for a period of time sufficient to oxidize substantially all of the CO to carbon dioxide (CO₂) and at least a portion of the HC to CO₂ and water; the oxidation catalyst being dispersed on channel walls of a flow-through support body as a washcoat comprising (i) a mixed oxide layer consisting essentially of particles of co-precipitated mixed oxides of cerium, zirconium, and copper (CeZrCuO₂) and (ii) a discrete PGM layer consisting essentially of particles of at least one platinum group metal dispersed on particles of aluminum oxide (PGM/Al₂O₃), the layers of the washcoat being arranged such that a portion of the CO present in the exhaust gas stream is oxidized before the exhaust gas stream contacts the particles of PGM/Al₂O₃.

2. A method of oxidizing as recited in claim 1 in which the exhaust gas stream from the engine is often below 200 degrees Celsius.

3. A method of oxidizing as recited in claim 1 in which the exhaust gas stream comprises at least 500 ppm each of CO and HC.

4. A method of oxidizing as recited in claim 1 in which the mixed oxide layer comprises a metal component consisting essentially of elements of cerium (Ce), zirconium (Zr), and copper (Cu), and the metal component comprises, by mole, about 30 to 70% Ce, about 30 to 70% Zr, and the balance Cu.

5. A method of oxidizing as recited in claim 1 in which the mixed oxide layer comprises a metal component consisting essentially of elements of cerium (Ce), zirconium (Zr), and copper (Cu), and the metal component comprises, by mole, about 60% Ce, about 15% Zr, and about 25% Cu.

6. A method of oxidizing as recited in claim 1 in which the PGM layer is dispersed on the channels walls from an inlet face to an outlet face of the support body, and, thereafter, the mixed oxide layer is dispersed on the channel walls so that the mixed oxide layer overlies the PGM layer on the channel walls of the flow-through support body.

7. A method of oxidizing as recited in claim 1 in which the mixed oxide layer is dispersed on a first portion of the channel walls near an inlet face of the flow-through support body, and the PGM layer is dispersed on a second portion of the channel walls near an outlet face of the flow-through support body.

8. A method of oxidizing as recited in claim 1 in which the at least one platinum group metal consists of at least one of ruthenium, platinum, palladium, rhodium, osmium, and iridium.

9. A method of oxidizing as recited in claim 1 in which the at least one platinum group metal comprises a combination of platinum and palladium, and the mass ratio of platinum to palladium in the PGM layer is about 7 to 1.

10. A method of oxidizing as recited in claim 1 in which the at least one platinum group metal is a combination of gold and palladium, and the mass ratio of gold to palladium in the layered oxidation catalyst is about 1 to 1.

11. A method of oxidizing as recited in claim 1 in which the particles of co-precipitated mixed oxides of cerium, zirconium, and copper have a one-phase crystalline structure.

12. A method of oxidizing as recited in claim 1 in which the support body is of an extruded cordierite material and has a uniform cylindrical cross-section with inlet and outlet faces transverse to a flow direction of the exhaust gas stream, comprising at least 400 channels per square inch of inlet face cross-sectional area, and being sized to promote the oxidation of CO and HC in the exhaust gas stream flowing through the support body.

* * * * *